(12) United States Patent
Gibson et al.

(10) Patent No.: US 8,924,070 B2
(45) Date of Patent: *Dec. 30, 2014

(54) METHODS AND SYSTEMS FOR A HYBRID VEHICLE

(71) Applicant: Ford Global Technologies, LLC, Dearborn, MI (US)

(72) Inventors: Alex O'Connor Gibson, Ann Arbor, MI (US); Mark Steven Yamazaki, Canton, MI (US); Jeffrey Allen Doering, Canton, MI (US); Dennis Craig Reed, Dexter, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,566

(22) Filed: Mar. 18, 2014

(65) Prior Publication Data

US 2014/0200794 A1    Jul. 17, 2014

Related U.S. Application Data

(63) Continuation of application No. 13/738,888, filed on Jan. 10, 2013, now Pat. No. 8,738,215.

(60) Provisional application No. 61/642,849, filed on May 4, 2012.

(51) Int. Cl.
| | | |
|---|---|---|
| G01M 17/00 | (2006.01) | |
| F02D 41/14 | (2006.01) | |
| B60W 20/00 | (2006.01) | |
| B60W 10/02 | (2006.01) | |
| B60W 10/06 | (2006.01) | |
| F02D 41/30 | (2006.01) | |
| G01M 15/04 | (2006.01) | |
| G06N 99/00 | (2010.01) | |
| B60K 6/48 | (2007.10) | |
| B60W 50/00 | (2006.01) | |

(52) U.S. Cl.
CPC ........... *F02D 41/1402* (2013.01); *B60W 20/50* (2013.01); *B60W 10/02* (2013.01); *B60W 10/06* (2013.01); *B60W 20/00* (2013.01); *B60W 20/40* (2013.01); *F02D 41/30* (2013.01); *G01M 15/044* (2013.01); *G06N 99/005* (2013.01); *B60W 2600/00* (2013.01); *Y10S 903/946* (2013.01); *Y10S 903/93* (2013.01); *B60K 2006/4825* (2013.01); *B60W 2050/0088* (2013.01); *B60W 2050/0089* (2013.01); *Y02T 10/6252* (2013.01)
USPC .......... 701/29.1; 701/29.2; 903/946; 903/930

(58) Field of Classification Search
CPC ........... B60W 10/06; B60W 2050/021; G01R 31/006; G01R 31/2829
USPC ................................................. 701/29.1–29.2
See application file for complete search history.

(56) References Cited

U.S. PATENT DOCUMENTS

| | | |
|---|---|---|
| 6,035,626 A | 3/2000 | Wahl et al. |
| 6,178,736 B1 | 1/2001 | Massey |

(Continued)

*Primary Examiner* — Hussein A. Elchanti
(74) *Attorney, Agent, or Firm* — David Kelley; Alleman Hall McCoy Russell & Tuttle LLP

(57) ABSTRACT

Systems and methods for learning torque estimate errors and updating torque estimation models are presented. In one example, torque errors are learned during an engine shutdown, after a disconnect clutch coupled between an engine and an electric machine has been released. An updated torque estimation model is then used to control torque during subsequent engine operation to improve drive feel and vehicle performance.

16 Claims, 9 Drawing Sheets

(56) References Cited

U.S. PATENT DOCUMENTS

| | | |
|---|---|---|
| 2004/0123587 A1 | 7/2004 | Kamiya et al. |
| 2004/0166988 A1 | 8/2004 | Zimmermann et al. |
| 2004/0237517 A1* | 12/2004 | Cho et al. ............ 60/370 |
| 2007/0068476 A1 | 3/2007 | Asada |
| 2007/0222407 A1* | 9/2007 | Sakamoto et al. ............ 318/611 |
| 2008/0053777 A1 | 3/2008 | Kamei et al. |
| 2009/0209381 A1* | 8/2009 | Ai et al. ............ 475/5 |
| 2009/0241884 A1 | 10/2009 | Saitoh et al. |
| 2010/0038158 A1* | 2/2010 | Whitney et al. .......... 180/65.265 |
| 2010/0131174 A1 | 5/2010 | Wiggins et al. |
| 2012/0318235 A1 | 12/2012 | Kaiser et al. |
| 2013/0006459 A1* | 1/2013 | Kim et al. ............ 701/22 |
| 2013/0184922 A1* | 7/2013 | Kabe ............ 701/22 |
| 2013/0297113 A1 | 11/2013 | Banker et al. |

* cited by examiner

METHODS AND SYSTEMS FOR A HYBRID VEHICLE

CROSS REFERENCE TO RELATED APPLICATIONS

The present application is a continuation of U.S. patent application Ser. No. 13/738,888, "METHODS AND SYSTEMS FOR A HYBRID VEHICLE," filed on Jan. 10, 2013, which claims priority to U.S. Provisional Application Ser. No. 61/642,849, "METHODS AND SYSTEMS FOR A HYBRID VEHICLE," filed on May 4, 2012, the entire contents of each of which are hereby incorporated by reference for all purposes.

FIELD

The present description relates to a system and methods for improving drivability and fuel economy of a vehicle. The methods may be particularly useful for engines that are selectively coupled to an electrical machine and a transmission.

BACKGROUND AND SUMMARY

Hybrid vehicles potentially offer fuel efficiency and vehicle driving range improvements over non-hybrid vehicles. One example of a hybrid vehicle includes an engine that may be selectively coupled to an electrical machine and a transmission according to vehicle operating conditions. The engine may be selectively coupled to the electric machine and transmission via an electrically or hydraulically actuated disconnect clutch. The disconnect clutch allows the electric machine to provide torque to vehicle wheels during low torque demand conditions without having to operate the engine and without having to supply torque to rotate an engine that is not combusting an air-fuel mixture. The disconnect clutch may also be used to restart the engine from a condition of no rotation via the electric machine.

Selectively coupling an electric machine to an engine via a disconnect clutch may also present issues that are not observed in a non-hybrid vehicle. For example, engine starting may introduce vibrations and torque impulses to the vehicle driveline. If the disconnect clutch is applied too abruptly, noise and vibration may be introduced to the vehicle driveline such that the driver may be disturbed. Likewise, if the disconnect clutch is released too abruptly, the driver may be disturbed. Finally, it may be desirable to improve disconnect clutch operation so that smooth transitions between operating the vehicle without the engine and operating the vehicle with the engine may occur.

The inventors herein have recognized the above-mentioned disadvantages and have developed a method of operating a hybrid vehicle comprising, during selected engine shut-down conditions, releasing a disconnect clutch coupled between an engine and an electric machine in a vehicle driveline, and after disconnect clutch release, estimating torque errors based on deviations of an actual engine speed profile from a commanded engine speed profile at each of a plurality of engine speed set-points. In this way, torque errors may be learned.

In one example, during an engine shut-down condition, the engine may be selectively deactivated and a disconnect clutch coupled between the engine and the rest of the vehicle driveline, including an electric machine, a transmission, and vehicle wheels, may be released. Based on the vehicle speed and pedal position at the time of shut-down, a rolling stop may be expected. An engine controller may determine an engine torque to be commanded before the clutch is released. The commanded engine torque may be such that substantially zero torque is maintained across the disconnect clutch upon release. In the absence of engine torque estimation errors, following disconnect clutch release, the engine may follow an expected speed profile that is based on the commanded torque. Therefore, based on deviations of the actual engine speed profile from the expected value, torque over-estimation and under-estimation errors may be learned. In particular, the speed profile may be assessed in a window surrounding one or more selected engine speed set-points. The speed set-points may be selected based on engine torque error history and may correlate with speed set-points where driveline disturbances have been experienced. The errors may be learned as a function of engine speed and actuator settings. The learned errors may then be used to update a torque estimation model, and control engine torque during a subsequent engine restart when the clutch is applied.

In this way, torque estimation errors may be learned and torque control may be improved. By learning torque errors and updating a torque estimation model, driveline torque disturbances of a hybrid driveline may be reduced. Further, the approach may improve vehicle drivability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
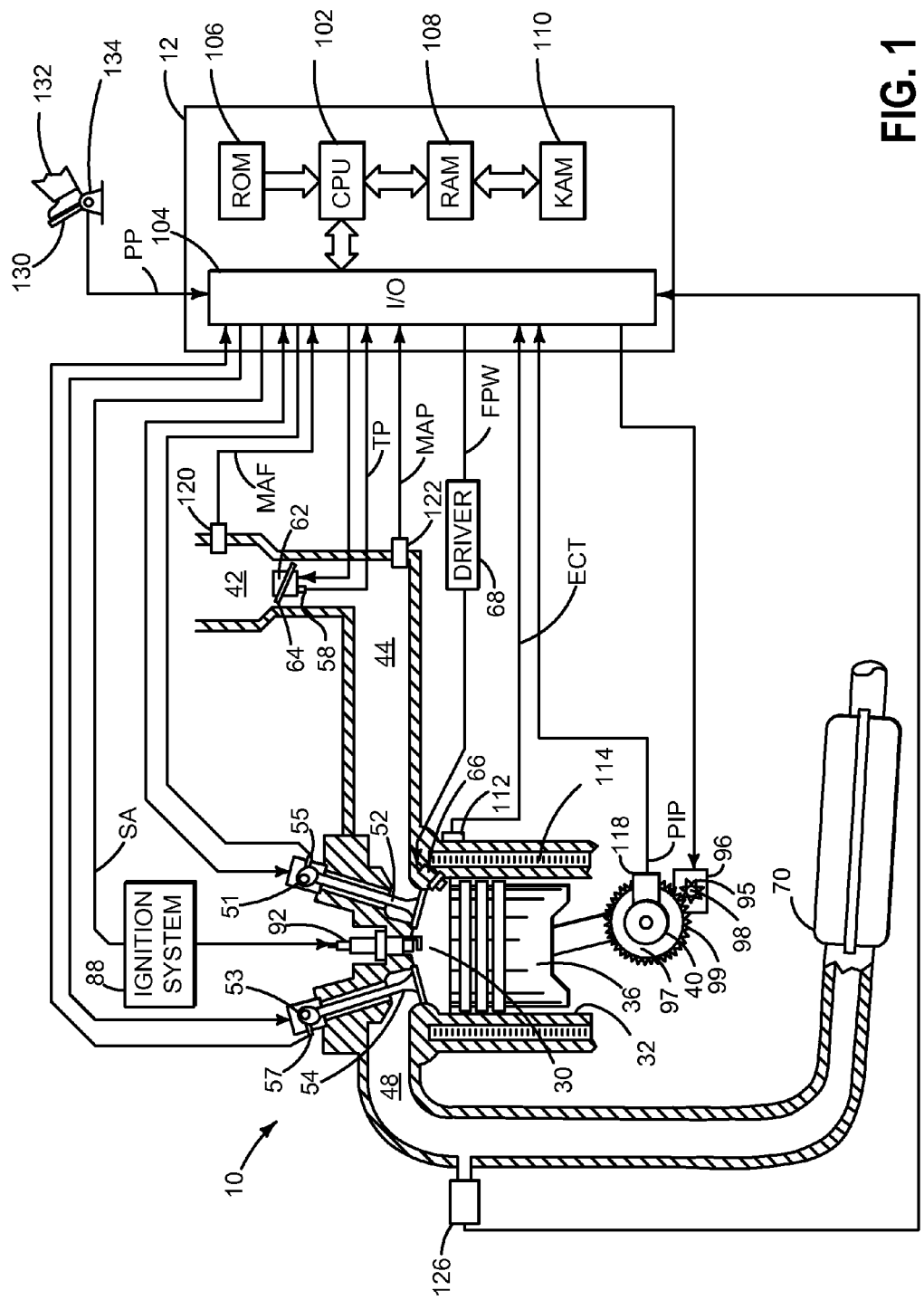
FIG. 1 is a schematic diagram of an engine.
Figure 2:
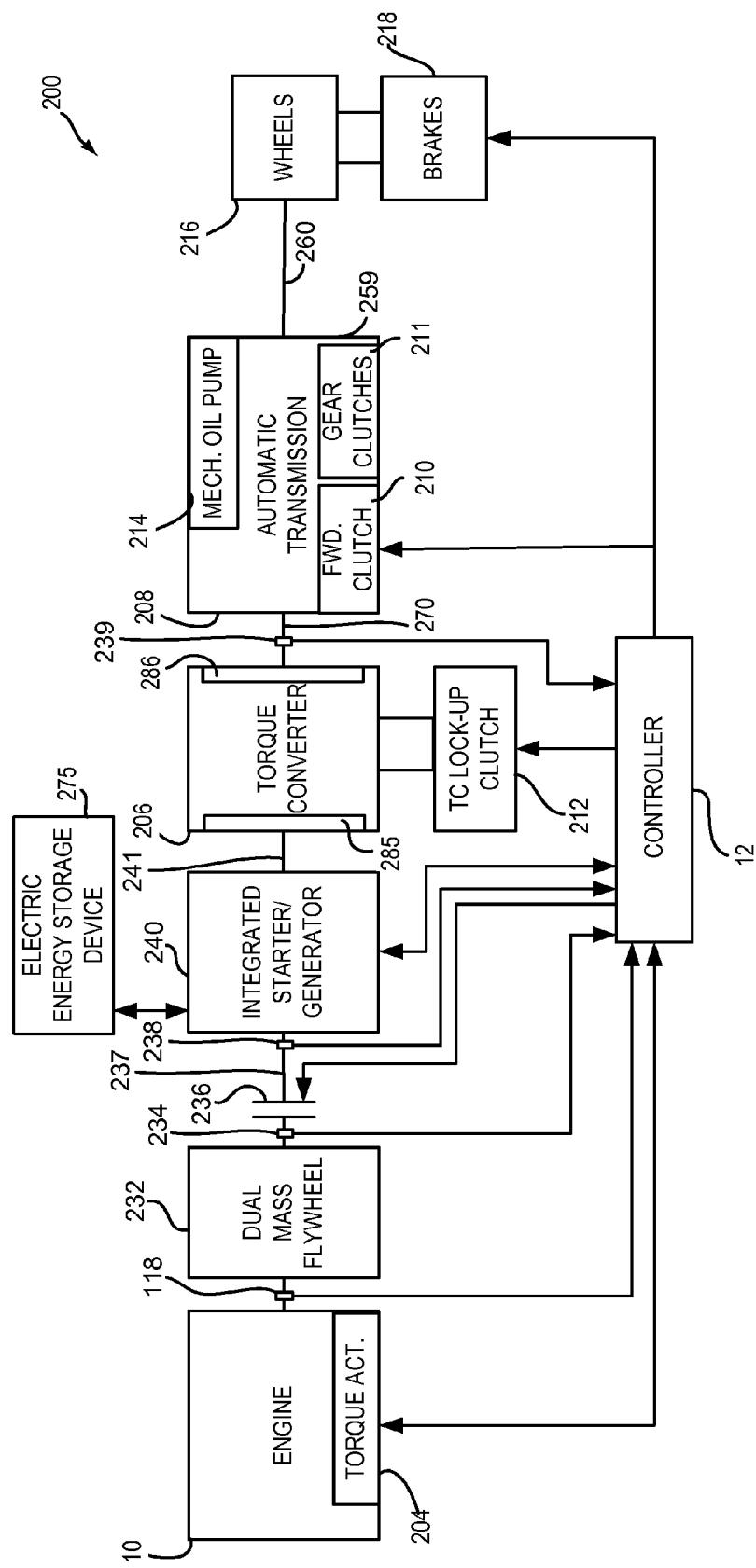
FIG. 2 is shows a first example vehicle driveline configuration.
Figure 3:
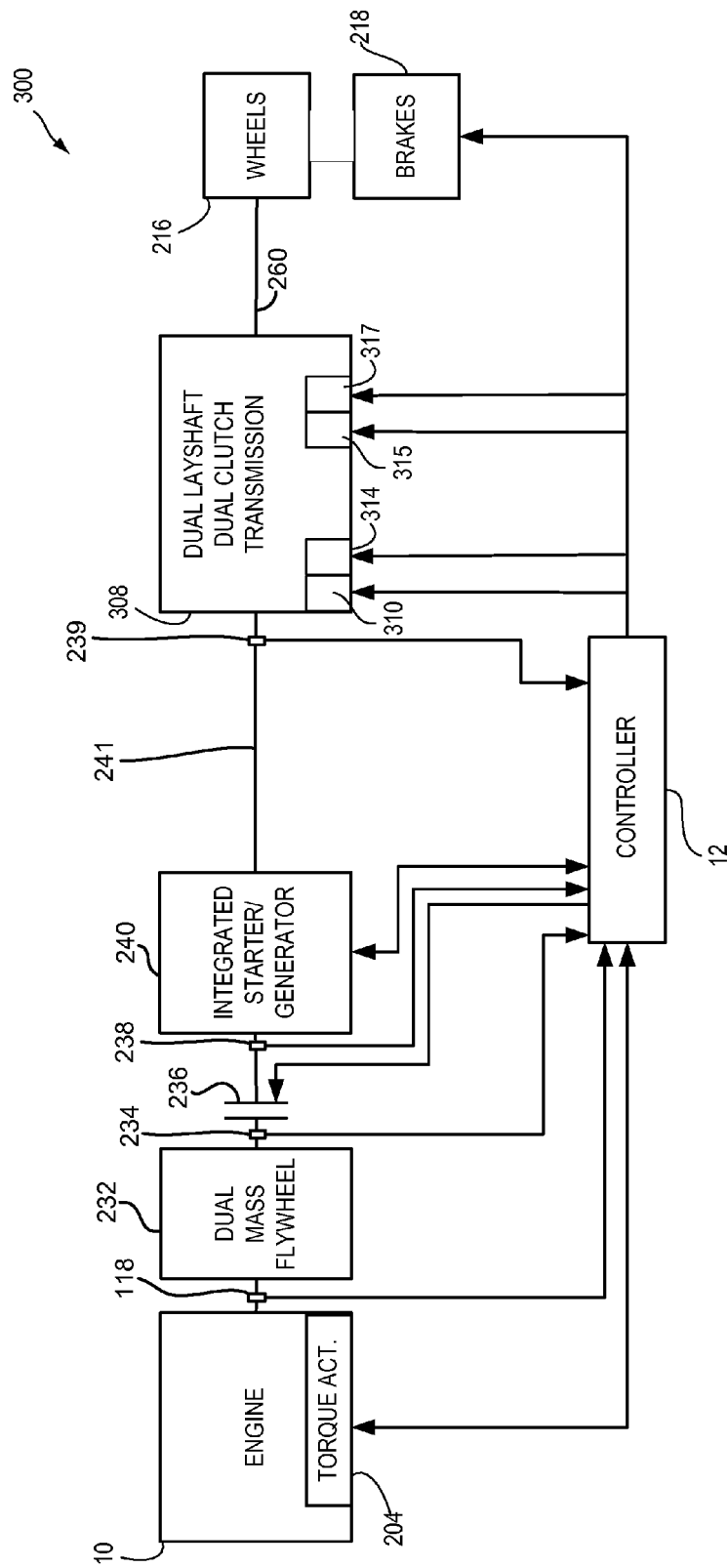
FIG. 3 is shows a second example vehicle driveline configuration.
Figure 7:
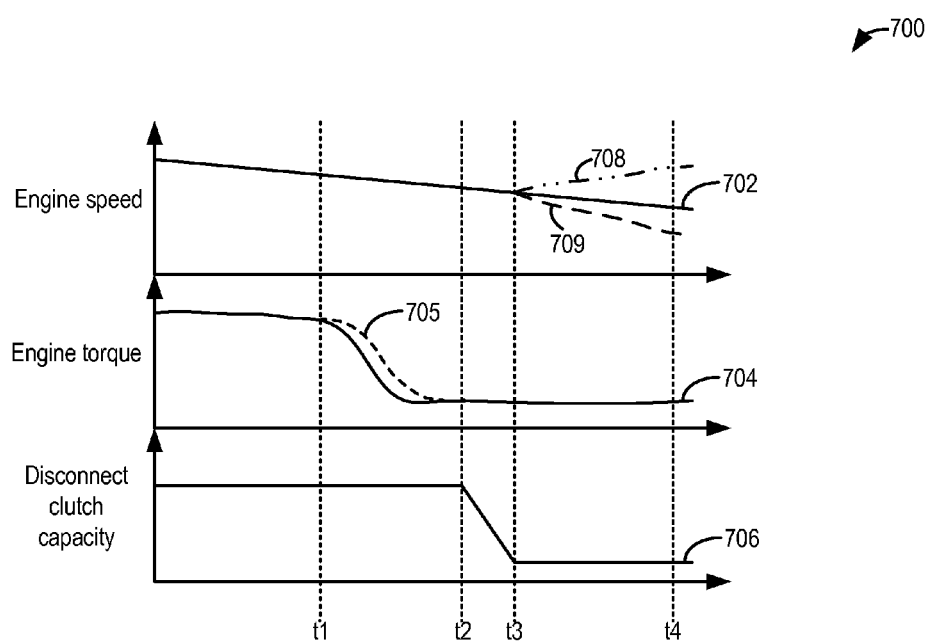
FIG. 7 is an example plot depicting learning of torque errors based on the approach of FIG. 5.
Figure 8:
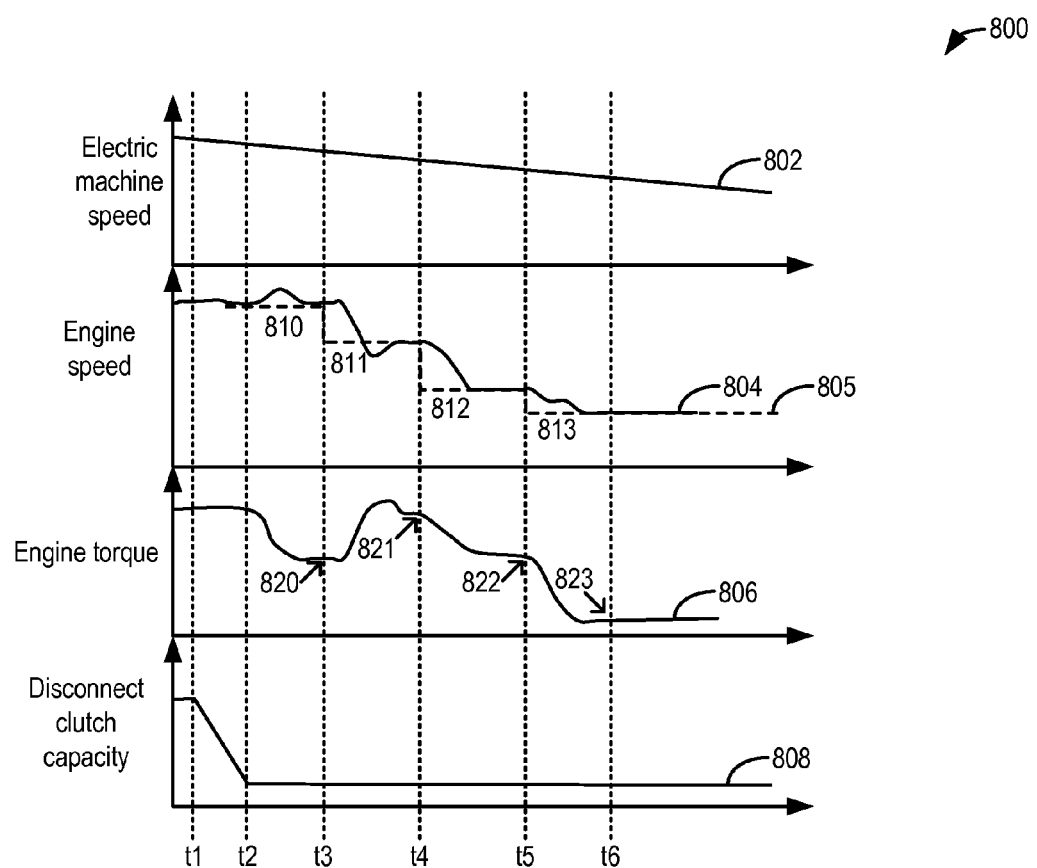
FIGS. 8-9 are example plots depicting learning of torque errors based on the approach of FIG. 6.
Figure 9:
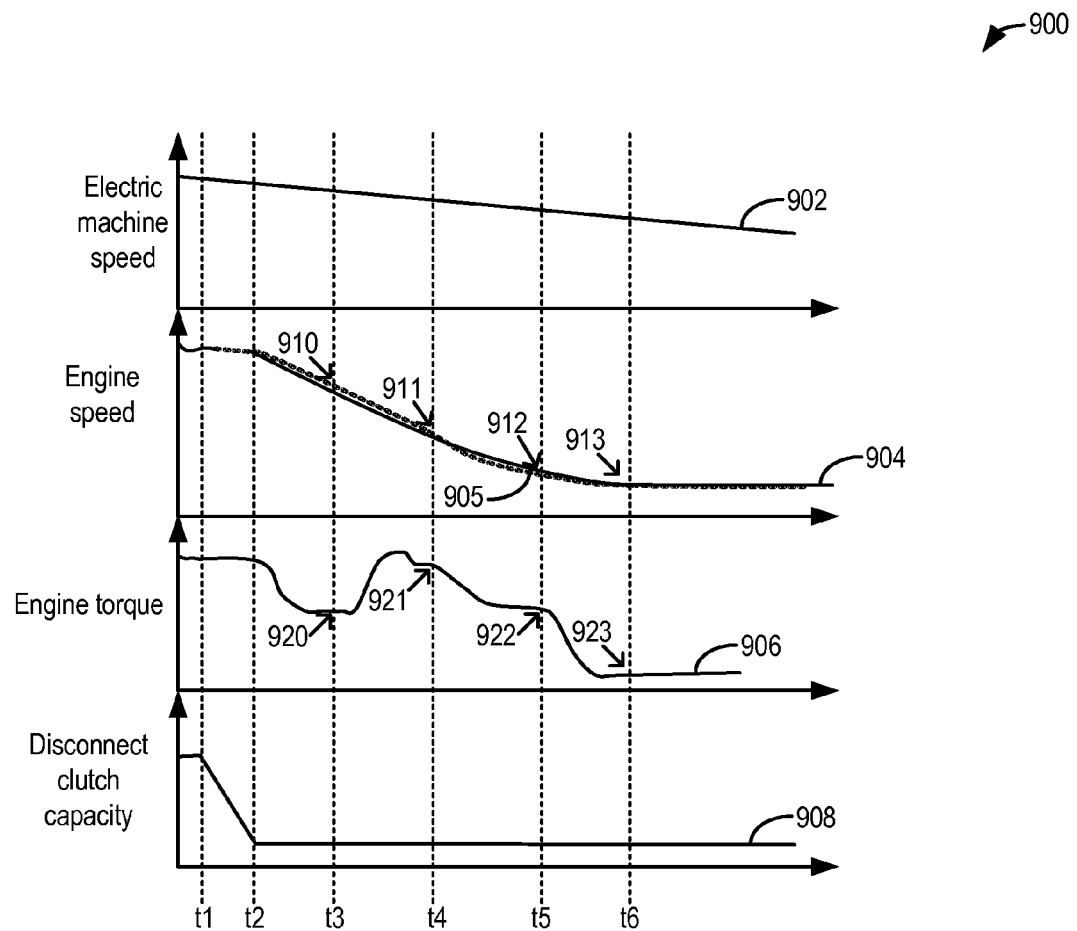

The present description is related to controlling a driveline of a hybrid vehicle. The hybrid vehicle may include an engine and electric machine as shown in FIGS. 1-3. The engine may be operated with or without a crankshaft integrated starter/generator (CISG) during vehicle operation. Additionally, the CISG may be operated with or without operating the engine. During selected engine shut-down conditions, when the engine is deactivated and a clutch coupling the engine to the remainder of the vehicle driveline is released, engine torque estimation errors may be learned based on deviations of engine speed response and/or electric machine speed response from their expected values, following the clutch release. An engine controller may be configured to perform control routines, such as the example routines of FIGS. 4-6, to learn torque errors based on engine speed profile deviations, engine deceleration profile deviations, etc. over a time or speed-based window following the clutch release. Examples of learning torque error based on the deviations, following the clutch release, are shown at FIGS. 7-9. The torque errors may be learned as a function of engine settings and actuator settings and may be used to update a torque estimation model. In this way, during subsequent engine operation, engine torque may be better controlled to reduce driveline disturbances.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2 and 3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10. Engine 10 may be started with an engine starting system shown in FIG. 1 or via CISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to CISG input shaft 237.

CISG may be operated to provide torque to driveline 200 or to convert driveline torque into electrical energy to be stored in electric energy storage device 275. Electrical energy storage device 275 may be a battery, capacitor, or inductor. The downstream side of CISG 240 is mechanically coupled to the impeller 285 of torque converter 206 via shaft 241. The upstream side of the CISG is mechanically coupled to the disconnect clutch 236. Torque converter 206 includes a turbine 286 to output torque to shaft 270. Shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or CISG via input shaft 241, for example. Thus, the hydraulic pressure generated in mechanical oil pump 214 may increase as an engine speed and/or CISG speed increases, and may decrease as an engine speed and/or CISG speed decreases.

Controller 12 may be configured to receive inputs from engine 10, as shown in more detail in FIG. 1, and accordingly control a torque output of the engine and/or operation of the torque converter, transmission, CISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from CISG by adjusting current flowing to and from field and/or armature windings of CSIG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch (es) to the transmission case 259 and vehicle frame as described in U.S. patent application Ser. No. 12/833,788 "METHOD FOR CONTROLLING AN ENGINE THAT MAY BE AUTOMATICALLY STOPPED" which is hereby fully incorporated by reference for all intents and purposes. A transmission clutch pressure may be varied (e.g., increased) to adjust the engagement state of a transmission clutch, and provide a desired amount of transmission torsion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When restart conditions are satisfied, and/or a vehicle operator wants to launch the vehicle, controller 12 may reactivate the engine by resuming cylinder combustion. As further elaborated with reference to FIGS. 4-9, the engine may be started in a variety of ways.

Referring now to FIG. 3, a second example vehicle driveline configuration is shown. Many of the elements in driveline 300 are similar to the elements of driveline 200 and use equivalent numbers. Therefore, for the sake of brevity, the description of elements that are common between FIG. 2 and FIG. 3 is omitted. The description of FIG. 3 is limited to elements that are different from the elements of FIG. 2.

Driveline 300 includes a dual clutch-dual layshaft transmission 308. Transmission 308 is essentially an automatically operated manual transmission. Controller 12 operates first clutch 310, second clutch 314, and shifting mechanism 315 to select between gears (e.g., $1^{st}$-$5^{th}$ gears) 317. First clutch 310 and second clutch 314 may be selectively opened and closed to shift between gears 317. Output shaft 260 delivers torque from transmission 308 to wheels 216.

Applicants have recognized that for hybrid powertrains with a disconnect clutch (shown at FIG. 2 as 236) at the engine output between the engine and the electric machine (or CISG), it may be important to be able to connect and disconnect the engine both quickly and smoothly. Specifically, the responsiveness is important particularly for connecting the engine when the engine is required to accelerate the vehicle as requested by the driver's input. Likewise, a smooth transition is desired to facilitate transparent mode transitions. For this to be achieved, the drive-train needs to be able to robustly actuate engine torques near zero across a range of engine speeds.

For example, when the disconnect clutch is being applied or released, a change in the torque from the clutch into the powertrain and driveline (herein referred to as $T_{clutch}$) will be proportional to the clutch torque capacity being used to hold the engine and electric machine speeds (since the speeds on both sides of the clutch are equal when the clutch is locked). Ignoring high-frequency damper/flywheel dynamics, the following parameters and their respective units are defined:

$T_{eng}$: Engine output torque, sum of indicated, friction and pumping (does not include $I\alpha$ effect), Nm $I_{eng}$: Inertia of all components rotating with the engine, Nm/(rpm/sec)

$N_{eng}$: Engine speed, rpm $N_{em}$: Electric machine speed, rpm $\alpha_{eng}$:

$$\text{Engine acceleration} = \frac{dN_{eng}}{dt},$$

rpm/sec $\alpha_{em}$:

$$\text{Electric Machine acceleration} = \frac{dN_{em}}{dt},$$

rpm/sec $T_{cap}$: Disconnect clutch capacity, Nm $T_{clutch}$: Disconnect clutch torque (what is actually applied), Nm output of clutch, input to electric machine and torque converter this torque will be negative when the clutch is pulling the engine up $T_{net}$: "net" engine torque at clutch input (what would be measured by a torque sensor)=$T_{eng}$−$I_{eng}$·$\alpha_{eng}$ If the clutch is slipping, the following applies:

$$T_{clutch} = T_{cap} \cdot \text{sign}(N_{eng} - N_{em})$$

$$T_{net} = T_{clutch}$$

$$\alpha_{eng} = \frac{T_{eng} - T_{net}}{I_{eng}}$$
$$= \frac{T_{eng} - T_{clutch}}{I_{eng}}$$
$$= \frac{T_{eng} - T_{cap} \cdot \text{sign}(N_{eng} - N_{em})}{I_{eng}}$$

If the clutch is locked, the following applies:

$\alpha_{eng}$=$\alpha_{em}$,$N_{eng}$=$N_{em}$ $T_{clutch}$=$T_{net}$=$T_{eng}$−$I_{eng}$·$\alpha_{eng}$, limited by $|T_{clutch}|\leq T_{cap}$ On release of the disconnect clutch, the clutch capacity is being decreased to zero from some value that is high enough to keep it locked. If we state the system goal to be minimizing change in $T_{clutch}$ as a result of the clutch release, where $T_{clutch}$ will decrease to zero when $T_{cap}$ reaches zero, then we need the following to be true just prior to and during the clutch release:

$T_{net}$=0

$T_{eng}$=$I_{eng}$·$\alpha_{eng}$=$I_{eng}$·$\alpha_{em}$

In other words, the engine torque (not including $I\alpha$ effect), should be proportional to the electric machine acceleration. If the electric machine speed is constant during the clutch release, then the engine torque should be zero.

In comparison, on clutch application, the clutch capacity is being increased from zero to a high value to ensure that it will stay locked. If we state the system goal to be minimizing change in $T_{clutch}$ as a result of the clutch application, then we need the following to be true just prior to and during the clutch application:

$N_{eng}$=$N_{em}$ so that engine acceleration required to lock the clutch is minimized $T_{eng}$=$I_{eng}$·$\alpha_{eng}$=$I_{eng}$·$\alpha_{em}$ In other words, the engine torque (not including $I\alpha$ effect), should be proportional to the electric machine acceleration. If the electric machine speed is constant during the clutch application, then the engine torque should be zero.

For both clutch application and release, it is desirable to be able to actuate engine torque robustly at the desired level proportional to the electric machine acceleration. This actuation of engine torque needs to be robust to noise factors such as part-to-part variability, engine speed when clutch is applied or released (e.g., in the range of ~600 to 3000 rpm), green engine friction, changes in engine friction over time due to engine wear, variation in oil viscosity due to temperature, oil type, oil age, varying barometric pressure (based on its impact on engine pumping losses), aircharge estimation errors.

Thus, at the time of disconnect clutch application or release, to minimize torque disturbances, engine torque must be actuated correctly. If this is achieved, the engine acceleration will not change due to clutch release. However, if the engine torque is over- or under-delivered at the time of clutch release, then the engine acceleration will change or differ from the acceleration expected based on the estimated engine torque. This would indicate a torque estimation (or delivery) error.

Applicants herein have recognized, accordingly, that by comparing the expected engine speed response (including an engine speed or acceleration/deceleration profile) following clutch release with the actual engine speed response, torque estimation errors may be learned and used to update an engine torque estimation model. This allows torque errors to be learned and applied on subsequent engine operation, such as during clutch application on a subsequent engine restart operation, and during clutch release on a subsequent engine shut-down operation.

Figure 4:
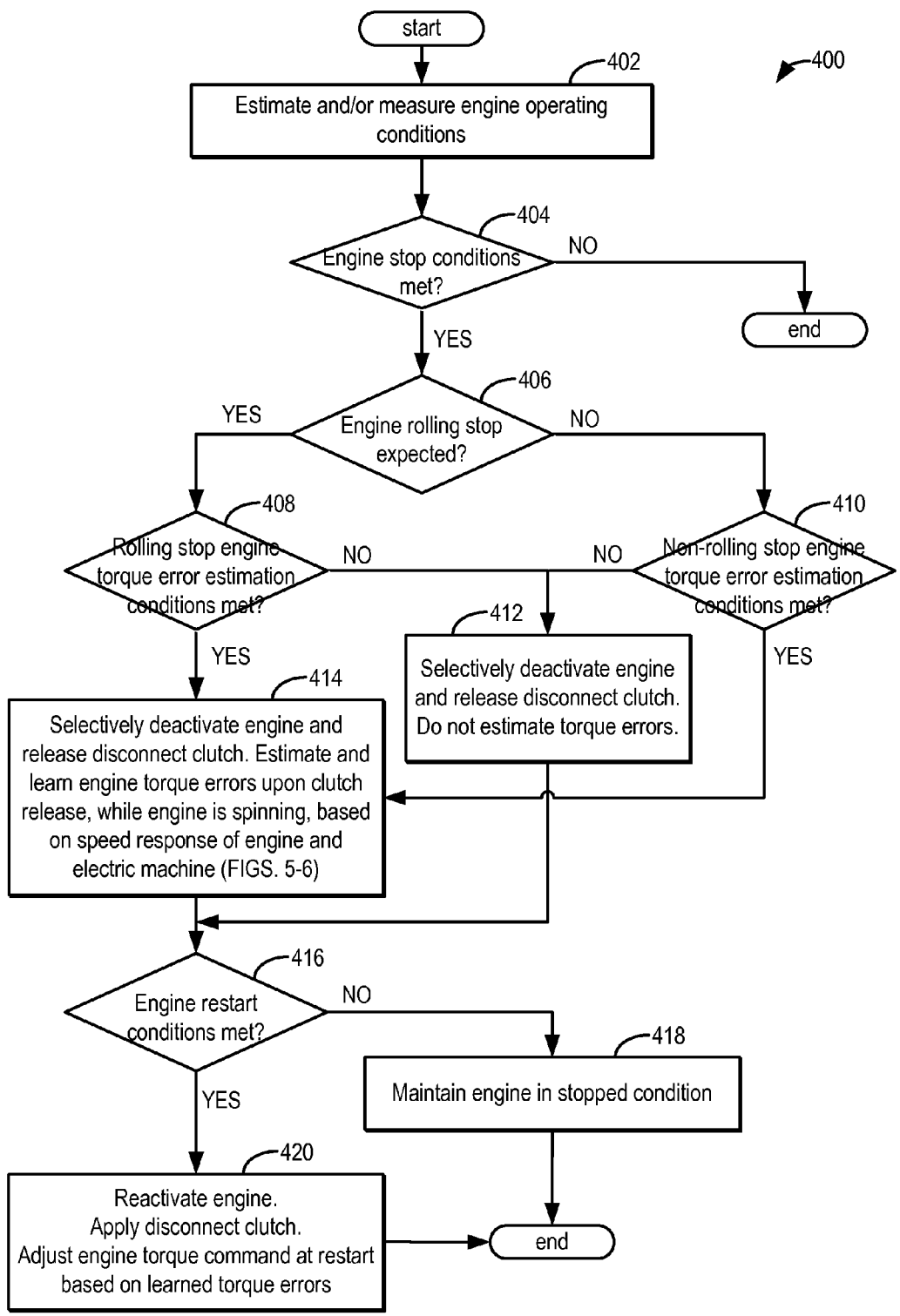
FIG. 4 is a flowchart for learning torque estimation errors during an engine shut-down condition and controlling engine torque during subsequent engine operation based on the learned errors.
Figure 5:
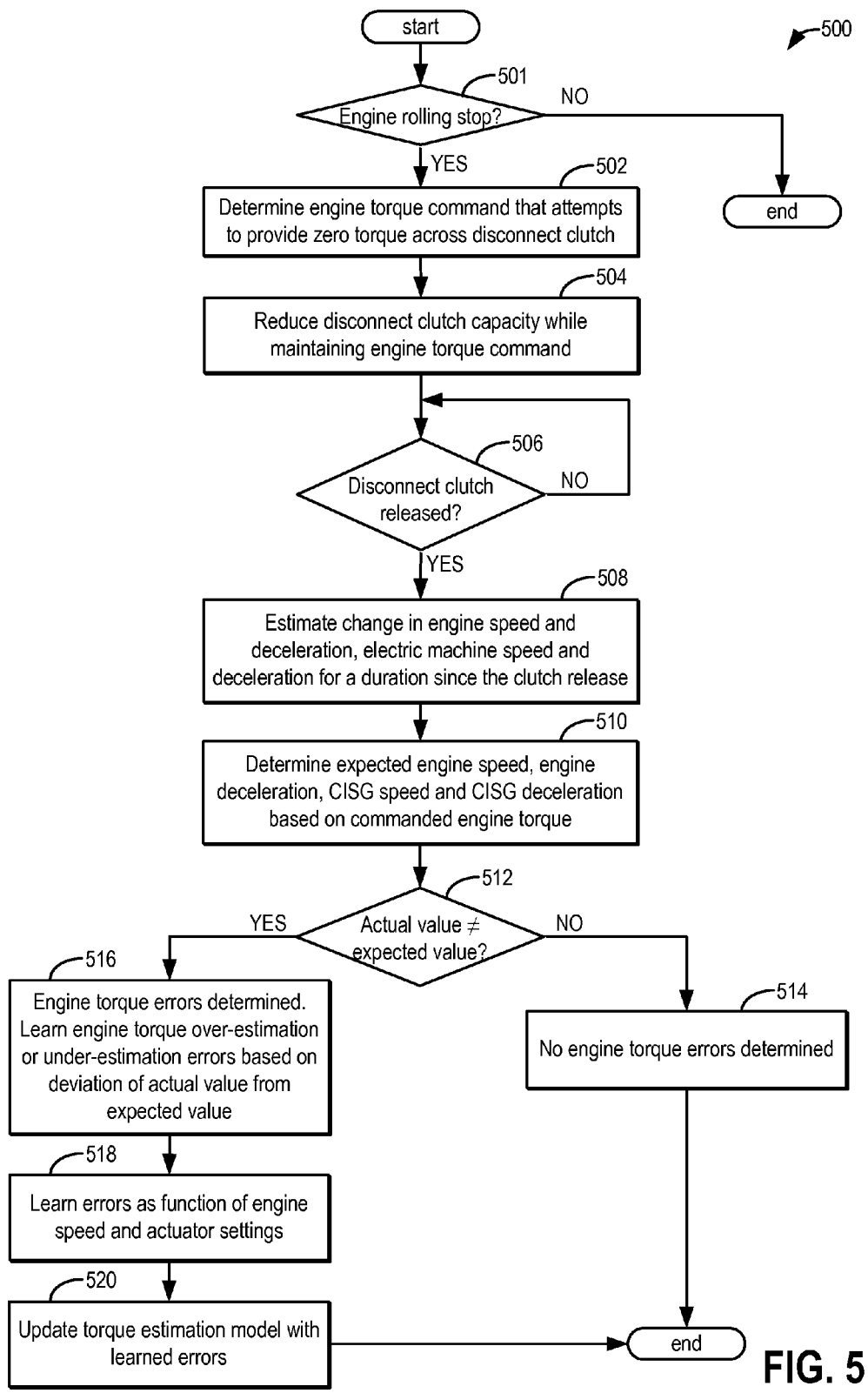
FIG. 5 is a flowchart of a method for learning torque errors based on deviations in engine speed, engine acceleration, and engine torque from their commanded values.
Figure 6:
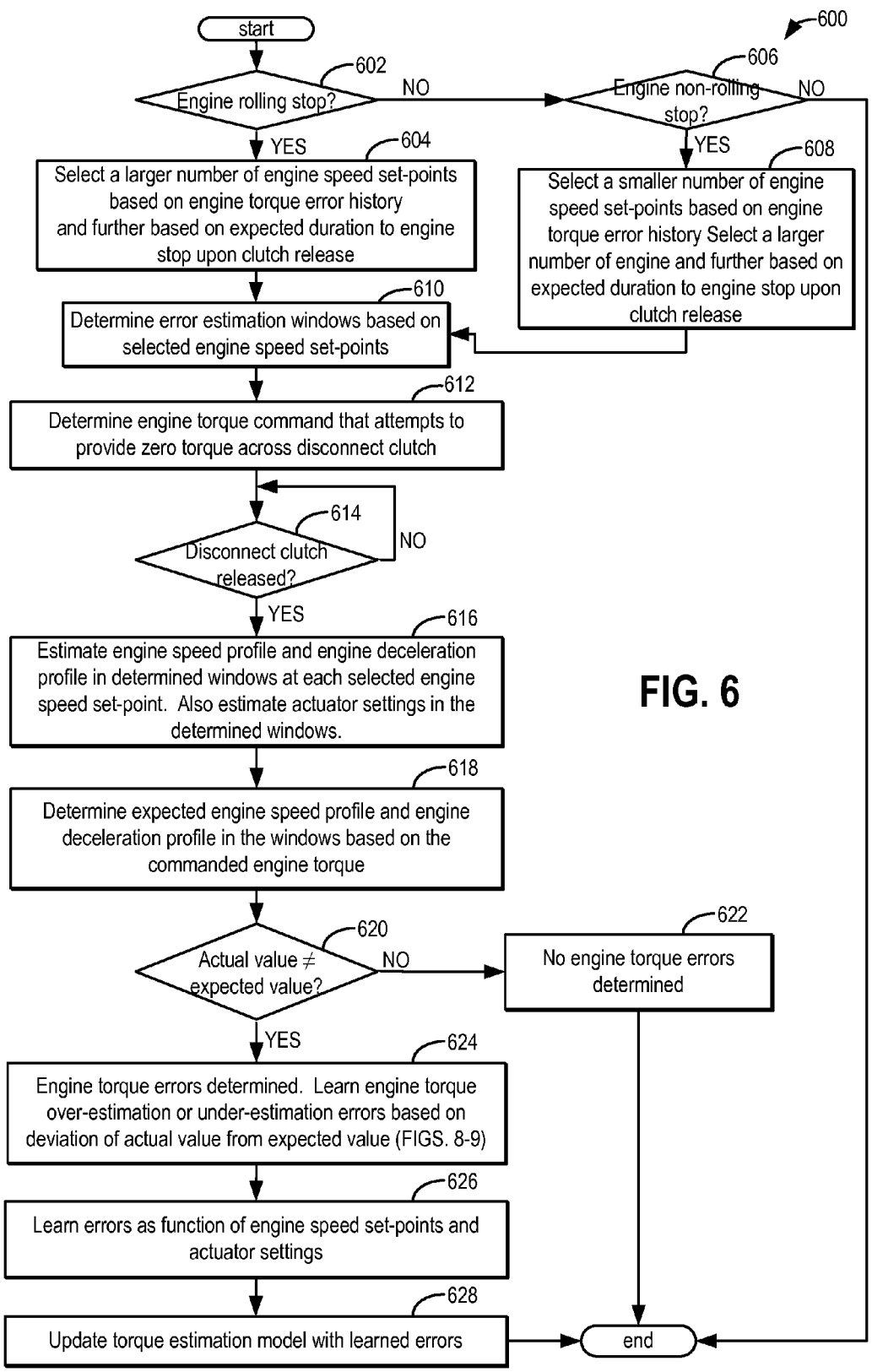
FIG. 6 is a flowchart of a method for learning torque errors based on deviations in engine speed profile and engine acceleration profile from expected profiles at one or more selected engine speed set-points.

Referring now to FIG. 4, a flowchart of an example method to operate a vehicle driveline and learn torque errors with the methods of FIGS. 5-6 is shown. The method of FIG. 4 may be stored as executable instructions in non-transitory memory of controller 12 shown in FIGS. 1-3.

At 402, method 400 determines operating conditions. Operating conditions may include but are not limited to torque demand, engine speed, engine torque, electric machine or CISG speed and torque, vehicle speed, ambient temperature and pressure, and battery state of charge. Torque demand may be derived from accelerator pedal 130 and controller 12 of FIG. 1. Method 400 proceeds to 402 after operating conditions are determined.

At 402, it may be determined whether engine-stop conditions have been met. An engine stop may be requested via an operator key or pushbutton input that has a sole function of requesting an engine start. Alternatively, an engine stop may be automatically requested by controller 12 based on operating conditions. As an example, an engine stop may be requested in response to the desired driveline torque being less than a threshold, a vehicle speed being less than a threshold speed, or engine torque being less than a threshold torque. As another example, controller 12 may request an engine stop in response to a driver applying a vehicle brake pedal or in response to a battery state of charge (being higher than a threshold). Thus, a request to stop the engine may be initiated via inputs that have functions other than solely requesting an engine stop. In still other examples, an engine stop may be automatically requested in response to any of the following idle-stop conditions being met. These may include, for example, the engine carrying out combustion, the battery state of charge being above a threshold (e.g., more than 30%), vehicle speed being above a threshold, a request for air conditioning not being made, engine temperature being above a threshold, emission control device temperature being above a threshold (e.g., above a light-off temperature), driver requested torque being below a threshold, vehicle electrical load being below a threshold, etc. If engine stop conditions are not met, the routine may end with engine operation being maintained. That is, the engine may not be shutdown.

Upon confirming that engine stop conditions have been met, at 406, it may be determined if an engine rolling stop is expected. In one example, an engine rolling stop, or vehicle coasting, may be expected when the brake pedal and accelerator pedal are not pressed and the vehicle is moving. In another example, an engine rolling stop may be expected based on an indicated desired duration to engine complete stop. For example, a vehicle speed at the time of engine stop conditions being met may be estimated and it may be determined whether the vehicle speed is above a threshold speed. The threshold speed may correspond to an amount of vehicle inertia that may not be able to sustain vehicle coasting for a substantial duration, and a potential vehicle stall may be imminent. Thus, if the vehicle speed is above the threshold, an engine rolling stop may be performed which provides fuel economy benefits. In still another example, an engine rolling stop may be expected based on traffic and geographical information regarding the environment of the vehicle, such as determined from a vehicle navigation system. For example, if the vehicle is being driven in a city where frequent starts and stops occur, an engine rolling stop may not be expected.

If a rolling stop is expected, then at 408, rolling stop torque error estimation conditions may be confirmed. This may include confirming that vehicle speed is above a minimum threshold speed but below a threshold maximum speed, battery state of charge is less than a threshold (so that regenerating braking power may be directed from the electric machine into the battery during the rolling stop), motor torque is less than a threshold (so that there is sufficient torque capacity in the motor relative to the negative torque generated during the rolling stop), fuel level in a vehicle fuel tank is higher than a threshold, the transmission is in the required gear (else, the gears may need to be shifted before a torque error can be estimated), etc.

If rolling stop torque estimation conditions are not met, then at 412, the routine includes selectively deactivating the engine by shutting of fuel and spark to the engine and releasing a disconnect clutch coupled between the engine and an electric machine (such as a motor or a CISG) in the vehicle driveline. The controller may then bring the engine to a rolling stop but may not proceed to estimate torque errors upon clutch release during the rolling stop. In one example, a deceleration fuel shut-off (DFSO) operation may be executed to shut-off a fuel supply to the engine while the engine continues to rotate. Specifically, upon initiation of a DFSO operation, fuel injection is cut-off to the cylinders. The engine then gradually spins towards rest.

If rolling stop torque estimation conditions are met, then at 414, the routine includes selectively deactivating the engine. In addition, a disconnect clutch coupled between the engine and an electric machine (such as a motor or a CISG) in the vehicle driveline may be released. Optionally, to maintain a constant torque at the vehicle wheels, a motor torque may be increased. As elaborated at FIGS. 5-6, the controller may then estimate a torque error after the disconnect clutch release (but before fuel to the engine is deactivated) based on deviations in one or more of engine torque, engine speed, and engine acceleration/deceleration from their commanded values at a point of clutch release. The engine speed response may be assessed at each of a plurality of engine speed set-points.

Additionally, torque errors may be estimated based on deviation in the machine speed and machine acceleration from the expected profile, for example, at each of a plurality of engine speed set-points. In one example, the machine is the CISG. In another example, the machine is a motor of the hybrid vehicle driveline. As also elaborated at FIGS. 5-6, the estimated errors may be learned as a function of engine settings, such as engine speed, as well as actuator settings, such as throttle angle, boost level, cam timing, valve timing, etc. The learned errors may be used to update a torque estimation model.

Returning to 406, if a rolling stop is not expected, then at 410, non-rolling stop torque error estimation conditions may be confirmed. These may include confirming that a change of mind restart is not expected or requested. If a driver change of mind restart is expected, the torque error estimation using the approach of FIG. 6 may not be performed. As such, if the driver has a change of mind and requests an engine restart from the engine stop condition immediately, the controller may be configured to not perform the engine torque error estimation (or stop it immediately, if the change of mind restart is requested during the torque error estimation) and expedite bringing the engine to a complete stop so as to expedite a subsequent engine restart responsive to the driver change of mind.

If non-rolling stop torque estimation conditions are not met, then the routine moves to 412. Here the routine includes selectively deactivating the engine by shutting of fuel and spark to the engine and releasing a disconnect clutch coupled between the engine and an electric machine (such as a motor or a CISG) in the vehicle driveline. The controller may then bring the engine to a non-rolling stop (e.g., a quicker stop) but may not proceed to estimate torque errors upon clutch release during the non-rolling stop.

If non-rolling stop torque estimation conditions are met, then the routine proceeds to 414 wherein the engine is selectively deactivated. In addition, a disconnect clutch coupled between the engine and an electric machine (such as a motor or a CISG) in the vehicle driveline may be released. Optionally, to maintain a constant torque at the vehicle wheels, a motor torque may be increased. As elaborated at FIGS. 5-6, the controller may then estimate a torque error after the disconnect clutch release based on deviations in one or more of engine torque, engine speed, and engine acceleration/deceleration from their commanded values at a point of clutch release. In particular, the controller may estimate torque errors based on deviation of the actual engine speed profile from the commanded engine speed profile at each of a plurality of engine speed set-points.

As such, a number of engine speed set-points at which the engine speed response is studied may differ based on whether the engine stop was a rolling stop or a non-rolling stop. In particular, a larger number of engine speed set-points may be assessed for torque errors when the engine is undergoing a rolling stop (due to the relatively longer duration till complete engine rest) while a smaller number of engine speed set-points may be assessed for torque errors when the engine is undergoing a non-rolling stop (due to the relatively shorter duration till complete engine rest).

From 414, the routine may proceed to 416 wherein method 400 judges whether or not engine restart conditions have been met and an engine start is desired. An engine start may be requested via an operator key or pushbutton input that has a sole function of requesting an engine start. Alternatively, an engine restart may be automatically requested by controller 12 based on operating conditions. For example, controller 12 may request an engine start in response to a driver releasing a vehicle brake pedal or in response to a battery state of charge. Thus, a request to restart the engine may be initiated via inputs that have functions other than solely requesting an engine start. If method 400 judges that an engine restart is requested, method 400 proceeds to 420. Otherwise, method 400 proceeds to 418 wherein the engine is maintained in the shut-down condition (or idle-stop condition) until engine restart conditions are met.

At 420, in response to engine restart conditions being met, the engine may be selectively reactivated (e.g., by resuming spark and fueling). In some embodiments, the engine may be cranked with the help of a starter, such as a starter having a lower torque output than the CISG. In another example, the engine may be started via the CISG while the starter with lower torque capacity remains deactivated. Upon reactivating the engine, the disconnect clutch may be applied. In addition, an engine torque may be commanded at or immediately before the clutch is applied to enable the smooth transition, wherein the engine torque command is based on the learned torque errors and the updated torque estimation model.

In this way, torque estimation errors may be learned so that torque errors can be reduced over time. This allows torque control to be improved, in particular, during application and release of a disconnect clutch in a hybrid vehicle driveline.

Now turning to FIG. 5, an example method 500 for learning torque estimation errors based on deviations in engine speed and acceleration following disconnect clutch release, during an engine shut-down, is shown. The method of FIG. 5 may be used as part of the routine of FIG. 4, such as at 414. An example plot elaborating torque error learning via the approach of FIG. 5 is shown at FIG. 7.

At 501, the method includes confirming that an engine rolling stop was requested. As such, the method 500 of FIG. 5 may only be performed during an engine rolling stop. Upon confirmation, at 502, the method includes attempting to provide zero torque across a disconnect clutch (upon clutch release), the disconnect clutch mechanically coupling an engine to an electric machine. In one example, the routine includes determining an engine torque command that provides substantially zero torque across the disconnect clutch upon clutch release, and commanding the determined torque command during the engine stop conditions immediately before the clutch is released.

Next at 504, the routine includes selectively deactivating the engine and reducing disconnect clutch capacity (so as to gradually release the disconnect clutch) while maintaining the determined engine torque command while the engine is decelerating. Next at 506, it may be confirmed that the disconnect clutch has been released. For example, it may be confirmed that the clutch capacity of the disconnect clutch is below a threshold, or at a minimum capacity. Upon confirming that the disconnect clutch has been released, at 508, the method includes estimating one or more of engine speed, engine acceleration/deceleration, and electric machine speed and machine acceleration/deceleration, for a duration since the clutch release.

At 510, an expected engine speed, engine acceleration/deceleration, and electric machine speed and machine acceleration/deceleration, for the duration since the disconnect clutch release may be determined based on the commanded engine torque. In one example, the determined engine torque command may be selected to decelerate the engine at an expected deceleration rate, or with an expected engine speed response, upon release of the disconnect clutch. Likewise, the determined engine torque command may be selected to provide an expected machine speed profile or acceleration rate, upon release of the disconnect clutch.

At 512, the actual engine speed and machine speed responses (estimated at 508) may be compared to the expected values (determined at 510). If the actual values match the expected values, then at 514, no engine torque error may be determined. In comparison, if the actual value does not match the expected value, at 516, the routine determines an engine torque error based on deviation of the actual values from the estimated values. Specifically, the engine controller estimates a torque error after disconnect clutch release based on deviation in one or more of engine speed, engine acceleration/deceleration, machine speed, machine acceleration/deceleration, and engine torque from their expected or commanded values at clutch release. In this way, the routine includes learning an engine torque error based on a speed response of the engine and/or the electric machine upon release of the disconnect clutch.

The controller may determine whether the estimated error was due to an over-estimation or under-estimation of engine torque based on the directionality of the deviation. In one example, learning a torque error based on the engine speed response includes estimating the engine torque error based on a deviation of the actual deceleration rate of the decelerating engine from the expected deceleration rate. As such, if the engine torque command is maintained after disconnect clutch release, and if the torque command correctly corresponded to zero torque across the disconnect clutch, then upon clutch release, the electric machine speed should remain constant (or within a threshold of its previous speed, such as within 10

RPM) while the engine should maintain its current speed or decelerate at a constant small rate from before the clutch release. Thus, in response to a change in machine speed, and a change in engine speed or deceleration rate after the clutch release (as compared to before the clutch release), an engine torque error is determined. The learning may further include learning an engine torque over-estimation error if the engine decelerates slower than the expected deceleration rate (or engine speed is higher than the expected speed), and learning an engine torque under-estimation error if the engine decelerates faster than the expected deceleration rate (or engine speed is lower than the expected speed).

At 518, the torque errors may be learned as a function of engine settings and actuator settings. For example, the torque errors may be learned as a function of engine speed. As another example, the torque errors may be learned as a function of throttle angle, valve timing, spark timing, cam timing, boost level, manifold air flow, etc. In one example, the controller may update the errors in a look-up table that stores the estimated torque errors as a function of the engine and actuator settings.

At 520, the routine includes updating an engine torque estimation model with the learned torque errors. This allows torque control during subsequent engine operation to be improved. For example, during a subsequent engine restart operation, the controller may control an engine torque commanded during the restart based on the updated engine torque estimation model. In particular, a more accurate torque command may be delivered during the subsequent engine restart at the time of disconnect clutch application.

As one example, during engine shut-down conditions, a controller may release a disconnect clutch coupled between an engine and an electric machine in a vehicle driveline. The electric machine may be a CISG, or an alternate motor, the machine coupling the engine to the transmission and vehicle wheels of the vehicle driveline. Before releasing the disconnect clutch, the controller may command an engine torque that will maintain a desired engine deceleration. The controller may then adjust one or more engine operating parameters to maintain the commanded engine torque. Subsequently, the disconnect clutch may be released. After releasing the disconnect clutch, the controller may determine torque estimation errors based on a deviation of the actual engine deceleration from the desired engine deceleration while the commanded engine torque is maintained.

In this way, torque errors may be learned during an engine shut-down, upon disconnect clutch release, while an engine is spinning, based on an engine speed response upon the clutch release. By learning the torque errors as a function of engine settings and applying the learned errors to provide more accurate torque control during subsequent engine operation, driveline disturbances arising during clutch application and release can be reduced, and a smoother transition can be achieved.

FIG. 7 shows an example of learning torque errors during engine shut-down conditions in a hybrid vehicle using the approach described at FIG. 6. In particular map 700 depicts changes in engine speed at plot 702, changes in an engine torque at plot 704, and changes in a disconnect clutch capacity at plot 706. Before t1, the engine may be operating with engine torque commanded based on operator torque demand (e.g., based on pedal position). As such, during this time, at least a portion of the demanded torque may be provided by the engine. For example, the entire torque demand may be met by the engine. Alternatively, the entire torque demand may be met by the engine and a system battery.

At t1, engine stop conditions may be confirmed. For example, an engine idle-stop condition may be confirmed. Accordingly, at t1, an engine torque may be commanded (plot 704, solid line) that enables substantially zero torque to be provided across a disconnect clutch mechanically coupling the spinning engine to a spinning electric machine, and thereon to the vehicle driveline transmission and wheels. The commanded engine torque may be determined as a function of the desired engine acceleration (or deceleration in this case) and the engine inertia. Between t1 and t2, the engine controller may adjust one or more engine operating parameters to bring an estimated engine torque (plot 705, dashed line) closer to the desired/commanded engine torque (plot 704, solid line).

At t2, the estimated engine torque may settle close to the target torque. Accordingly, at t2, the controller may start reducing a clutch capacity of the disconnect clutch (plot 706) so as to release the clutch, while holding the engine torque command (plot 704) constant. As such, the controller is attempting to provide zero torque across a disconnect clutch upon clutch release by determining an engine torque command that provides substantially zero torque (e.g., within a threshold amount around zero) and commanding the determined torque command before (e.g., immediately before) the clutch release.

As such, if the engine torque command delivered is correct, no substantial change in engine speed should be incurred upon release of the clutch (that is, no change in speed that is more than a threshold amount, e.g., more than 10 rpm of the previous speed), and the engine may continue to accelerate or decelerate substantially similar (that is, at a similar small rate) to before the clutch is released (that is, along plot 702). However, if there was an error in the torque estimate, and accordingly in the commanded torque, the engine speed response following the clutch release will deviate from the expected value.

At t3, the clutch capacity may reduce to a minimum capacity. Once the clutch capacity has dropped and the disconnect clutch has been released, an engine controller may monitor and estimate engine parameters over a duration since the clutch release (that is, for a duration between t3 and t4). The parameters estimated over the defined duration may include an average engine acceleration (accel_ave), average engine speed (rpm_ave), and average estimated engine torque (tq_ave). The controller may then compute and learn an engine torque error (tq_error) as being:

$$tq\_error = tq\_ave - accel\_ave * engine\ inertia$$

In this way, the controller may learn errors in air and fueling required to provide the zero torque based on a speed profile of the engine and/or the electric machine for a duration following the clutch release.

Learning errors based on the speed profile of the engine includes, for example, if an actual engine speed profile over the duration is higher than an expected engine speed profile, learning an error corresponding to an over-estimation of engine torque. An example torque over-estimation or over-delivery error is indicated at plot 708 (dashed and dotted line). As another example, learning errors based on the speed profile of the engine includes, if the actual engine speed profile over the duration is lower than the expected engine speed profile, learning an error corresponding to an under-estimation of engine torque. An example torque under-estimation or under-delivery error is indicated at plot 709 (dashed line). In each case, the expected engine speed profile is based on the engine torque command (plot 706).

The torque errors may be learned as a function of engine speed and one or more engine actuator settings. For example, the error may be learned as a function of one or more of throttle, EGR, boost, MAF, MAP, cam timing and valve timing settings at the point of torque error identification. The learned error may then be used to update an engine torque estimation model. In particular, the engine torque estimation model may use various parameters to estimate a friction torque, such as the torque error, barometric pressure, engine oil temperature, average engine speed, etc. The torque error used in the torque estimation model during an engine restart may be updated to refer to the torque error learned during the immediately preceding engine shut-down.

As previously explained, the torque error learning approach described at FIGS. 5 and 7 may be performed during an engine rolling stop condition. That is, torque errors may be learned, as described above, during engine idle-stop conditions when a vehicle speed is higher than a threshold speed and while the disconnect clutch is release when the vehicle speed is above the threshold speed.

Now turning to FIG. 6, an example method 600 for learning torque estimation errors based on deviations in engine speed and acceleration following disconnect clutch release, at selected engine speed set-points during an engine shut-down, is shown. The method of FIG. 6 may be used as part of the routine of FIG. 4, such as at 414. Example plots elaborating torque error learning via the approach of FIG. 6 is shown at FIGS. 7 and 8. It will be appreciated that the following approach may be performed to learn torque errors after a disconnect clutch has been released but before fuel has been deactivated to the engine to shut down the engine.

At 602, the method includes determining if an engine rolling stop was requested or expected. As elaborated previously at FIG. 4 (at 406), an engine rolling stop may be determined and differentiated from an engine non-rolling stop based at least on pedal positions as well as a vehicle speed (relative to a threshold) at the time the engine stop was requested. If an engine rolling stop is confirmed, the routine proceeds to 604. Else, the routine proceeds to 606 to determine if an engine non-rolling stop was requested or expected. If an engine non-rolling stop is confirmed, the routine proceeds to 608. As such, the method 600 of FIG. 6 may be performed during an engine rolling stop as well as during an engine non-rolling stop, however, a number of engine speed set-points at which engine and/or electric machine speed response is monitored and assessed, for learning torque errors, may vary based on the nature of the engine stop.

At 604 and 608, a plurality of engine speed set-points are selected at which torque estimation errors will be determined. In both cases, the plurality of engine speed set-points are selected based on an engine torque error history. For example, the engine speed set-points may be selected based on past information stored in the controller's memory regarding engine torque delivery errors. An indication of engine torque delivery error at those selected engine speed set-points may have been based on engine acceleration data and/or based on driveline disturbances experienced during and after disconnect clutch application and release.

As indicated above, a number of engine speed set-points may differ for an engine rolling stop versus an engine non-rolling stop. In particular, at 604, a larger number of engine speed set-points are selected during engine shut-down condition when the engine is coasting to rest (that is, for an engine rolling stop condition) while at 608, a smaller number of engine speed set-points are selected when the engine is rapidly (e.g., substantially immediately) stopped (such as for an engine non-rolling stop condition). Herein, the number of engine speed set-points are selected based on a desired duration to engine rest during the engine shut-down conditions, the number of engine speed set-points selected increased as the desired duration to engine rest increases (as in the case for the rolling stop). In still another example, the number of engine speed set-points at which the errors are learned may be increased as a difference between an engine speed at which the clutch is released and engine rest (that is, zero speed) increases.

From 604 and 608, the routine proceeds to 610 wherein error estimation windows are determined based on the selected engine speed set-points having a history of torque disturbances. The windows may correspond to speed windows around the selected engine speed set-point, error estimations to be performed based on engine (or machine) speed responses within those windows. Next, at 612, an engine torque command may be determined that provides substantially zero torque across a disconnect clutch upon clutch release, the clutch mechanically coupling the engine to an electric machine and to a transmission and wheels of the vehicle driveline. The determined engine torque command may be commanded before the clutch is release, specifically, immediately before the clutch release. In one example, the determined engine torque command may correlate with an expected engine speed response, or engine speed profile, after the disconnect clutch is released. Likewise, the determined engine torque command may correlate with an expected machine speed response, or machine speed profile, after the disconnect clutch is released Next at 614, it may be confirmed that the disconnect clutch has been released. For example, it may be confirmed that the clutch capacity of the disconnect clutch is below a threshold, or at a minimum capacity. Upon confirming that the disconnect clutch has been released, at 616, the method includes estimating an engine speed profile and an engine acceleration/deceleration profile at each of the selected engine speed set-points, in the determined windows. Optionally, an electric machine speed profile and machine acceleration/deceleration profile may also be estimated at each of the selected engine speed set-points, in the determined windows. In addition to the engine speed response, actuator settings may also be estimated and determined at the selected engine speed set-points, in the determined windows.

At 618, an expected engine speed profile and engine acceleration/deceleration profile, at each of the selected engine speed set-points, may be determined. Optionally, an expected electric machine speed profile and machine acceleration/deceleration profile may also be determined for each of the selected engine speed set-points. In one example, the expected engine speed profile may be based on the assumption of a zero torque being commanded (at 612). For example, the engine torque command may be selected to accelerate/decelerate the engine at an expected rate, or with an expected engine speed response, upon release of the disconnect clutch. Likewise, the determined engine torque command may be selected to provide an expected machine speed profile or acceleration rate, upon release of the disconnect clutch.

At 620, the actual engine speed response/profile and machine speed response/profile (estimated at 616) may be compared to the expected values (determined at 618). If the actual values match the expected values, then at 622, no engine torque error may be determined. In comparison, at 624, if the actual value does not match the expected value, the routine determines an engine torque error based on deviation of the actual values from the estimated values. Specifically, the engine controller estimates torque errors after disconnect clutch release based on deviations of an actual engine speed profile from a commanded (or expected) engine speed profile at each of the selected plurality of engine speed set-points. In this way, the routine includes learning an engine torque error based on a speed profile of the engine and/or the electric machine upon release of the disconnect clutch.

It will be appreciated that torque error estimations may not be performed if torque error estimation conditions are not met (as previously elaborated at FIG. 4, steps 408 and 410). For example, the controller may not estimate torque errors if a fuel level in a vehicle fuel tank is lower than a threshold. As another example, if a driver change of mind restart is expected, the torque error estimation using the approach of FIG. 6 may not be performed. Further, if a sudden driver change of mind restart request is received during the estimating and learning of torque errors, the estimating and learning of torque errors may be immediately discontinued and the controller may expedite spinning down of the engine to rest (to expedite an engine restart).

The controller may determine whether the estimated error was due to an over-estimation or under-estimation of engine torque based on the directionality of the deviation. As such, if the torque commanded before clutch release is maintained after clutch release, and if the torque command correctly corresponded to a substantially zero torque across the disconnect clutch, then upon clutch release, the engine speed profile should continue, unchanged (e.g., within a threshold such as 10 RPM), from the speed profile before clutch release. Thus, in response to a change in engine speed profile (or engine acceleration rate) after the clutch release, at the specific speed set-points, an engine torque error can be determined. The learning may further include learning an engine torque over-estimation error if the actual engine speed profile in the engine speed window is higher than the expected engine speed profile, and learning an engine torque under-estimation error if the actual engine speed profile in the engine speed window is lower than the expected engine speed profile.

As elaborated in the examples of FIGS. 8-9, learning errors based on engine speed profile deviations at specified engine speed set-points may be performed in various manners. In one approach illustrated at FIG. 8, the controller may specify an engine speed target (corresponding to a selected engine speed set-point) and may enable a closed loop controller to adjust actuator settings to hold the engine speed at the engine speed target. The torque model error and/or change in actuator settings (from initial settings) required to hold the engine speed at the target speed may then be learned. This may be repeated at each selected engine speed set-point. In an alternate approach illustrated at FIG. 9, the controller may prescribe or command a smooth engine speed profile and may capture engine speed, engine acceleration, and engine torque (commanded and estimated values) at the selected specified engine speed set-points while the engine is decelerating. The controller may enable a closed loop controller to adjust actuator settings to enable the commanded smooth engine speed profile. Torque model errors and/or change in actuator settings (from initial settings) are then learned or captures at each target speed set-point.

At 626, the torque errors may be learned and stored as a function of corresponding engine speed set-points (at which they were learned). The estimated torque errors may be further learned as a function of one or more engine actuator settings including throttle angle, spark timing, valve timing, cam timing, boost level, manifold air flow, etc. In one example, the controller may update the errors in a look-up table that stores the estimated torque errors as a function of the engine and actuator settings.

At 628, the routine includes updating an engine torque estimation model with the learned estimated torque errors. This allows torque control during subsequent engine operation to be improved. For example, during a subsequent engine restart operation, the controller may apply the disconnect clutch and adjust an engine air and fueling based on the learned torque errors to control an engine torque commanded at clutch application during the restart. In this way, a more accurate torque command may be delivered during the subsequent engine restart, reducing driveline disturbances at the time of clutch application. The learned torque errors may also be used to adjust an engine air and fueling to control an engine torque commanded at clutch release during a subsequent engine shut-down operation restart. In this way, a more accurate torque command may be delivered during the subsequent engine shut-down, reducing driveline disturbances at the time of clutch release.

FIG. 8 shows a first example of learning torque errors during engine shut-down conditions in a hybrid vehicle at selected speed set-points using the approach described at FIG. 6. In particular map 800 depicts changes in electric machine speed at plot 802, changes in engine speed at plot 804, changes in an engine torque at plot 806, and changes in a disconnect clutch capacity at plot 808. A desired (discontinuous) engine speed profile with discrete engine speed set-points at which torque errors are progressively estimated is shown at plot 805 (dashed line). It will be appreciated that the following approach may be performed to learn torque errors after a disconnect clutch has been released but before fuel has been deactivated to the engine to shut down the engine.

Before t1, the engine may be operating with engine torque commanded based on operator torque demand (e.g., based on pedal position). As such, during this time, at least a portion of the demanded torque may be provided by the engine. For example, the entire torque demand may be met by the engine. Alternatively, the entire torque demand may be met by the engine and a system battery.

At t1, engine stop conditions may be confirmed. For example, an engine idle-stop condition may be confirmed. Accordingly, at t1, an engine torque may be commanded (plot 806). In one example, the engine torque commanded may enable substantially zero torque to be provided across a disconnect clutch mechanically coupling the spinning engine to a spinning electric machine, and thereon to the vehicle driveline transmission and wheels. The commanded engine torque may be determined as a function of the engine inertia so that a specified engine speed profile (plot 805) can be achieved. The specified engine speed profile (plot 805) may be a discontinuous engine speed profile that includes discrete target engine speeds (810-813) to be achieved at specified times since the disconnect clutch is released. In particular, the target engine speed set-points may be speed set-points at which torque errors will be adaptively learned. The target engine speed set-points may be based on calibratable settings or driveline disturbances experience during disconnect release (or disconnect clutch application) on previous engine operation. Also at t1, a controller may start reducing a clutch capacity of the disconnect clutch (plot 808) so as to release the disconnect clutch. As such, once the disconnect clutch is released, the transmission is in a neutral gear.

As such, the controller is attempting to provide zero torque across a disconnect clutch upon disconnect clutch release by determining an engine torque command that provides substantially zero torque and commanding the determined torque command before (e.g., immediately before) the clutch release. As such, if the engine torque command delivered is correct, no substantial change in engine speed or machine speed (plot 802) should be incurred upon release of the clutch (e.g., no change higher than a threshold amount, such as more than 10 RPM from the previous value), and the engine may continue to accelerate/decelerate at a small, constant rate with a speed profile that is based on the profile before the clutch is released. However, if there was an error in the torque estimate, and accordingly in the commanded torque, the engine speed response following the clutch release will deviate from the expected value.

At t2, the engine clutch may be released. The controller may then set a first desired engine speed set-point 810 while enabling close loop control. Accordingly, an engine torque command expected to provide the engine speed set-point 810 may be delivered at t2. The controller may then wait for the engine speed to settle close to (e.g., within a threshold of) the desired target engine speed set-point. Likewise, the controller may also wait for the actual engine torque command to settle close to (e.g., within a threshold of) the requested torque. At t3, when engine speed and torque have settled, the controller may estimate the average engine acceleration (accel_ave), the average engine speed (rpm_ave) and the average estimated commanded engine torque (tq_ave) in a window surrounding the target speed set-point. In particular, the estimates may be determined in a window defined by the duration between t2 and t3 surrounding the first target speed set-point 810.

Between t2 and t3, the engine controller may adjust one or more engine operating parameters to adjust the engine torque and bring the actual engine speed closer to the target speed set-point. The controller may then capture the actual actuator settings used via closed loop control in the window between t2 and t3 to hold or bring the engine speed to target engine speed set-point 810.

At t3, the controller may further compute and learn an engine torque error 820 (tq_error) incurred at the engine speed set-point 810 as:

$$tq\_error = tq\_ave - accel\_ave * engine\ inertia$$

In this way, the controller may learn torque error 820, including errors in air and fueling, at the selected engine speed set-point 810. The controller may also learn and update actuator settings required to achieve and hold the engine speed at engine speed set-point 810.

At t3, the controller may then set a second desired engine speed set-point 811 while continuing close loop control. Accordingly, an engine torque command expected to provide the engine speed set-point 811 may be delivered at t3. The controller may then wait for the engine speed to settle close to (e.g., within a threshold of) the desired target engine speed set-point. Likewise, the controller may also wait for the actual engine torque command to settle close to (e.g., within a threshold of) the requested torque. At t4, when engine speed and torque have settled, the controller may estimate the average engine acceleration (accel_ave), the average engine speed (rpm_ave) and the average estimated commanded engine torque (tq_ave) in a window surrounding the target speed set-point. In particular, the estimates may be determined in a window defined by the duration between t3 and t4 surrounding the second target speed set-point 811.

Between t3 and t4, the engine controller may adjust one or more engine operating parameters to adjust the engine torque and bring the actual engine speed closer to the target speed set-point. The controller may then capture the actual actuator settings used via closed loop control in the window between t3 and t4 to hold or bring the engine speed to target engine speed set-point 811. At t4, the controller may further compute and learn an engine torque error 821 (tq_error) incurred at the engine speed set-point 811 using the equation described above. In this way, the controller may learn torque error 821, including errors in air and fueling, at the selected engine speed set-point 811. The controller may also learn and update actuator settings required to achieve and hold the engine speed at engine speed set-point 811.

The controller may continue to sequentially set target engine speed set-points 812 and 813 and learn respective torque errors 822 and 823 in respective windows t4 to t5 and t5 to t6.

Learning errors based on deviation of an actual speed profile of the engine from an expected engine speed profile in an engine speed window (that is based on selected engine speed set-points) includes, for example, if an actual engine speed profile in a window surrounding a selected engine speed set-point is higher than an expected engine speed profile, learning an error corresponding to an over-estimation of engine torque. Likewise, an error corresponding to an under-estimation of engine torque is learned if an actual engine speed profile in a window surrounding a selected engine speed set-point is lower than an expected engine speed profile.

The torque errors may be learned as a function of the corresponding engine speed set-points and one or more engine actuator settings captured in the corresponding window. For example, the error may be learned as a function of one or more of throttle, EGR, boost, MAF, MAP, cam timing and valve timing settings at the point of torque error identification. In this way, errors in air and fueling are learned as a function of corresponding engine speed set-points. The learned error may then be used to update an engine torque estimation model. In particular, the engine torque estimation model may use various parameters to estimate a friction torque, such as the torque error, barometric pressure, engine oil temperature, average engine speed, etc. The torque error used in the torque estimation model during an engine restart may be updated to refer to the torque error learned during the immediately preceding engine shut-down. In this way, the controller may control an engine torque commanded during a subsequent engine restart based on the learned engine torque error.

FIG. 9 shows a second example of learning torque errors during engine shut-down conditions in a hybrid vehicle at selected speed set-points using the approach described at FIG. 6. In particular map 900 depicts changes in electric machine speed at plot 802, changes in engine speed profile at plot 904 (solid line), changes in an engine torque at plot 906, and changes in a disconnect clutch capacity at plot 908. A desired (smooth and continuous) engine speed profile with discrete engine speed set-points at which torque errors are progressively estimated is shown at plot 905 (dashed line). It will be appreciated that the following approach may be performed to learn torque errors after a disconnect clutch has been released but before fuel has been deactivated to the engine to shut down the engine.

Before t1, the engine may be operating with engine torque commanded based on operator torque demand (e.g., based on pedal position). As such, during this time, at least a portion of the demanded torque may be provided by the engine. For example, the entire torque demand may be met by the engine. Alternatively, the entire torque demand may be met by the engine and a system battery.

At t1, engine stop conditions may be confirmed. For example, an engine idle-stop condition may be confirmed. Accordingly, at t1, an engine torque may be commanded (plot 906). In one example, the commanded engine torque may enable substantially zero torque to be provided across a disconnect clutch mechanically coupling the spinning engine to a spinning electric machine, and thereon to the vehicle driveline transmission and wheels. The commanded engine torque may be determined as a function of the engine inertia so that a specified engine speed profile (plot 905) can be achieved. The specified engine speed profile (plot 905) may be a smooth and continuous engine speed profile that includes discrete target engine speed set-points (910-913) to be achieved at specified times since the disconnect clutch is released. In particular, the target engine speed set-points may be speed set-points at which torque errors will be adaptively learned. The target engine speed set-points 910-913 may be based on calibratable settings or driveline disturbances experience during disconnect release (or clutch application) on previous engine operation. Also at t1, a controller may start reducing a clutch capacity of the disconnect clutch (plot 908) so as to release the clutch. As such, once the disconnect clutch is released, the transmission is in a neutral gear.

As such, the controller is attempting to provide zero torque across a disconnect clutch upon clutch release by determining an engine torque command that provides substantially zero torque and commanding the determined torque command before (e.g., immediately before) the clutch release. As such, if the engine torque command delivered is correct, no substantial change in engine speed (e.g., no change more than a threshold speed, such as more than 10 RPM of the previous value) should be incurred upon release of the clutch, and the engine may continue to accelerate/decelerate at a small and constant rate, with a speed profile that is based on the profile before the clutch is released. However, if there was an error in the torque estimate, and accordingly in the commanded torque, the engine speed profile following the clutch release will deviate from the expected profile.

At t2, the engine clutch may be released. The controller may then monitor the desired engine speed profile, while enabling close loop control, and select a first engine speed set-point 910 at which to adaptively learn torque errors. The controller may then wait for a measured engine speed to settle close to (e.g., within a threshold of) target engine speed set-point 910. At t3, when the actual engine speed profile has a speed setting that has crossed the prescribed set-point 910, the controller may estimate the average engine acceleration (accel_ave), the average engine speed (rpm_ave) and the average estimated commanded engine torque (tq_ave) in a window surrounding the target speed set-point 910. In particular, the estimates may be determined in a window defined by the duration between t2 and t3 surrounding the first target speed set-point 910.

Between t2 and t3, the engine controller may adjust one or more engine operating parameters to adjust the engine torque and bring the actual engine speed closer to the target speed set-point. The controller may then capture the actual actuator settings used via closed loop control in the window between t2 and t3 to hold or bring the engine speed to target engine speed set-point 910.

At t3, the controller may further compute and learn an engine torque error 920 (tq_error) incurred to bring the actual engine speed profile (plot 904) to the desired engine speed profile (plot 905) at speed set-point 910 as:

$$tq\_error = tq\_ave - accel\_ave * engine\ inertia$$

In this way, the controller may learn torque error 920, including errors in air and fueling, at the selected engine speed set-point 910. The controller may also learn and update actuator settings required to achieve and hold the engine speed at engine speed set-point 910.

Between t3 and t4, the controller may continue monitoring the engine speed profile, with close loop control, while waiting for the engine speed to approach a second target speed set-point 911. At t4, when the actual engine speed profile has a speed setting that has crossed the prescribed set-point 911, the controller may estimate the average engine acceleration (accel_ave), the average engine speed (rpm_ave) and the average estimated commanded engine torque (tq_ave) in a window surrounding the target speed set-point 911. In particular, the estimates may be determined in a window defined by the duration between t3 and t4 surrounding the second target speed set-point 911.

Between t3 and t4, the engine controller may adjust one or more engine operating parameters to adjust the engine torque and bring the actual engine speed closer to the target speed set-point. The controller may then capture the actual actuator settings used via closed loop control in the window between t3 and t4 to hold or bring the engine speed to target engine speed set-point 911. The controller may further compute and learn an engine torque error 921 incurred to bring the actual engine speed profile (plot 904) to the desired engine speed profile (plot 905) at speed set-point 911. The controller may continue to sequentially monitor the engine speed profile for deviation at selected target engine speed set-points 912 and 913 and learn respective torque errors 922 and 923 in respective windows t4 to t5 and t5 to t6.

In this way, in response to idle-stop conditions, a controller may release a disconnect clutch coupled between the engine and an electric machine (such as a CISG), and while the engine is decelerating, but before fuel injection to the engine is deactivated, a controller may learn an engine torque error within an engine speed window. The learned error may be estimated based on the deviation of an actual engine speed profile from an expected engine speed profile in the engine speed window, upon release of the clutch. For example, the controller attempts to provide zero torque across the disconnect clutch upon clutch release (by commanding the zero torque just before the clutch is released) and then, while the engine is decelerating, the controller learns errors in air and fueling required to provide the zero torque based on an engine speed profile in a window at each of a plurality of engine speed set-points. As illustrated in the above example, the controller may learn torque errors 920-923, including errors in air and fueling, at respective engine speed set-points 910-913. The controller may also learn and update actuator settings required to achieve and hold the engine speed at the corresponding engine speed set-points.

As previously explained, the torque error learning approach described at FIGS. 6, 8 and 9 may be performed during an engine rolling stop condition as well as an engine non-rolling stop condition with a number of engine speed set-points selected being larger for the engine rolling stop condition as compared to the engine non-rolling stop condition. As such, if torque errors are learned at various speed set-points during an engine rolling stop, the disconnect clutch may be released while a vehicle speed is above a threshold speed.

In this way, torque estimation errors may be learned based on an engine speed response following release of a clutch coupling the engine to an electric machine and the remainder of the vehicle driveline. By learning torque errors and updating a torque estimation model, driveline torque disturbances experienced during application and release of the clutch may be reduced. By improving torque control, vehicle drivability is improved. Additionally, the approach may reduce driveline wear, thereby increasing the operating life of the driveline.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for a hybrid vehicle, comprising:
   during selected engine shut-down conditions,
   releasing a disconnect clutch coupled between an engine and an electric machine in a vehicle driveline; and
   after disconnect clutch release and before fuel injection to the engine is deactivated, estimating torque errors based on actual engine speed profile deviations from a commanded engine speed profile at each of plural engine speed set-points; and
   adjusting engine operation based on the estimated torque errors.

2. The method of claim 1, wherein the plural engine speed set-points are selected based on an engine torque error history.

3. The method of claim 2, wherein a number of engine speed set-points are selected based on a desired duration to engine rest during the engine shut-down conditions, the number of engine speed set-points increased as the desired duration to engine rest increases.

4. The method of claim 2, wherein a larger number of engine speed set-points are selected during engine shut-down conditions when the engine is coasting to rest, and a smaller number of engine speed set-points are selected when the engine is substantially immediately stopped.

5. The method of claim 1, further comprising, not estimating the torque errors if a fuel level in a vehicle fuel tank is lower than a threshold.

6. The method of claim 1, further comprising, in response to a driver change of mind restart request received during the estimating, discontinuing the estimating of torque errors, and expediting spinning down of the engine to rest.

7. The method of claim 1, wherein the electric machine is a crankshaft integrated starter/generator (CISG) mechanically coupling the engine to a transmission and wheels of the vehicle driveline.

8. The method of claim 1, further comprising, learning the estimated torque errors as a function of corresponding engine speed set-points and updating an engine torque estimation model with the estimated torque errors.

9. The method of claim 1, wherein the estimated torque errors are further learned as a function of one or more engine actuator settings including throttle angle, spark timing, manifold air flow, and boost level.

10. The method of claim 8, further comprising, during a subsequent engine restart, applying the disconnect clutch and adjusting an engine air and fueling based on the learned torque errors to control an engine torque commanded at clutch application.

11. A method for a hybrid vehicle driveline, comprising:
    in response to idle-stop conditions and during a rolling engine stop:
       selectively deactivating an engine and releasing a disconnect clutch coupled between the engine and a CISG; the CISG coupled to driveline transmission and wheels; and
    while the engine is decelerating,
       maintaining an engine torque command; and
       learning an engine torque error within an engine speed window, the error estimated based on deviation of an actual engine speed profile from an expected engine speed profile in the engine speed window, upon release of the clutch; and
       controlling an engine torque based on the learned engine torque error.

12. The method of claim 11, wherein the engine speed window is selected based on an engine speed set-point having a history of torque disturbances.

13. The method of claim 12, wherein the learning an engine torque error within an engine speed window is performed at each of a plurality of engine speed set-points, the plurality of engine speed set-points selected based on driveline disturbances experienced during disconnect clutch release on previous engine idle-stop conditions.

14. The method of claim 12, wherein learning an engine torque error includes,
    learning an engine torque over-estimation error if the actual engine speed profile in the engine speed window is higher than the expected engine speed profile, and learning an engine torque under-estimation error if the actual engine speed profile in the engine speed window is lower than the expected engine speed profile.

15. The method of claim 11, wherein releasing a disconnect clutch includes releasing a disconnect clutch while a vehicle speed is above a threshold speed.

16. The method of claim 11, further comprising, learning the engine torque error as a function of engine speed and actuator settings at the engine speed and controlling an engine torque commanded during a subsequent engine restart based on the learned engine torque error.

* * * * *